United States Patent
Lefebure et al.

(10) Patent No.: US 11,554,891 B2
(45) Date of Patent: Jan. 17, 2023

(54) BOTTLES AND METHODS OF MAKING THE SAME

(71) Applicant: R & D Tool & Engineering Co., Lees Summit, MO (US)

(72) Inventors: Brian R. Lefebure, Lees Summit, MO (US); Kent Wesley Bersuch, Blue Springs, MO (US); Michael J. Wilkerson, Kansas City, MO (US); Jincheng Chen, Leawood, KS (US)

(73) Assignee: R & D Tool & Engineering Co., Lee's Summit, MO (US)

( * ) Notice: Subject to any disclaimer, the term of this patent is extended or adjusted under 35 U.S.C. 154(b) by 159 days.

(21) Appl. No.: 17/123,288

(22) Filed: Dec. 16, 2020

(65) Prior Publication Data

US 2021/0188475 A1 Jun. 24, 2021

Related U.S. Application Data

(60) Provisional application No. 62/950,567, filed on Dec. 19, 2019.

(51) Int. Cl.
| | |
|---|---|
| *B65D 1/02* | (2006.01) |
| *B65D 83/04* | (2006.01) |
| *A61J 1/03* | (2006.01) |
| *B29C 49/04* | (2006.01) |
| *B29C 49/08* | (2006.01) |
| *B29C 49/06* | (2006.01) |
| *B29L 31/00* | (2006.01) |
| *B29K 101/12* | (2006.01) |

(52) U.S. Cl.
CPC .............. *B65D 1/0223* (2013.01); *A61J 1/03* (2013.01); *B29C 49/04* (2013.01); *B29C 49/06* (2013.01); *B29C 49/08* (2013.01); *B65D 83/04* (2013.01); *B29K 2101/12* (2013.01); *B29L 2031/7158* (2013.01)

(58) Field of Classification Search
CPC ........ B65D 1/0223; B65D 1/02; B65D 11/20; B65D 83/04; B65D 83/0805; B65D 83/08; A61J 1/03; B29C 49/04; B29C 49/06; B29C 49/08
USPC ......... 215/383, 382; 220/675, 669; 206/536, 206/535, 540, 528
See application file for complete search history.

(56) References Cited

U.S. PATENT DOCUMENTS

| | | | |
|---|---|---|---|
| 3,235,111 A | 2/1966 | Whitton, Jr. et al. | |
| 3,477,561 A * | 11/1969 | Espinal | A61J 7/04 206/536 |

(Continued)

OTHER PUBLICATIONS

International Search Report and Written Opinion dated Mar. 19, 2021 for related PCT Patent Application No. PCT/US2020/065237, 16 pages.

*Primary Examiner* — Robert J Hicks
(74) *Attorney, Agent, or Firm* — Hovey Williams LLP; Kameron D. Kelly (57) ABSTRACT

A bottle configured to house and dispense items. The bottle comprises a body, a finish positioned above the body, and a ramp protruding into an interior space defined by the body. The body includes a base and a sidewall extending up from the base. The body defines the interior space for housing the items. The finish presents an opening for dispensing the items from the body. The ramp is formed with a concave shape configured to support one or more of the items.

22 Claims, 12 Drawing Sheets

(56) References Cited

U.S. PATENT DOCUMENTS

| | | |
|---|---|---|
| 3,536,223 A | 10/1970 | Muhlhoff |
| 3,538,543 A | 11/1970 | Nataf |
| 4,280,805 A | 7/1981 | Hafele |
| 4,653,668 A | 3/1987 | Gibilisco et al. |
| 5,065,875 A | 11/1991 | Balavich |
| 5,213,232 A | 5/1993 | Kraft et al. |
| 5,222,615 A | 6/1993 | Ota et al. |
| 5,881,721 A | 3/1999 | Bunce et al. |
| 2017/0021956 A1 | 1/2017 | Ring et al. |

* cited by examiner

BOTTLES AND METHODS OF MAKING THE SAME

RELATED APPLICATIONS

This non-provisional patent application claims priority benefit, with regard to all common subject matter, of commonly assigned U.S. provisional patent application Ser. No. 62/950,567, filed Dec. 19, 2019, and entitled "BOTTLE" ("the '567 application"). The '567 application is hereby incorporated by reference in its entirety into the present non-provisional patent application.

BACKGROUND

Packer bottles are largely used for pill and/or tablet housing and dispensing. Packer bottles generally have a finish on top of the bottle which retains a bottle cap. The body of the bottle is usually larger in diameter than the finish and therefore includes a shoulder to transition to the finish. When trying to dispense pills or tablets from a standard packer bottle, the pills can get caught in the upper shoulder making it difficult to dispense pills, and particularly to dispense a single pill at a time. Dispensing a single pill at a time can be especially difficult for users with limited range of motion in their fingers, such as users having arthritis. Users often resort to shaking the bottle to shift one or more of the pills or tablets just over the shoulder onto the finish. Such maneuvers risk launching the pills or tablets past the finish and out of the opening of the bottle, which is distressing, unsanitary, and can lead to the loss of pills or tablets. Such losses can be expensive due to the cost of many pharmaceuticals.

The background discussion is intended to provide information related to the present invention which is not necessarily prior art.

SUMMARY

The present invention solves the above-described problems and other problems by providing a bottle configured to increase accessibility to one or more items stored therein.

A bottle constructed in accordance with an embodiment of the present invention is configured to house and dispense items and comprises a body, a finish positioned above the body, and a ramp protruding into an interior space defined by the body. The body includes a base and a sidewall extending up from the base. The body defines the interior space for housing the items. The finish presents an opening for dispensing the items from the body. The ramp is formed with a concave shape configured to support one or more of the items. The concavity of the ramp collects the items in the bottle when the bottle is oriented horizontally, which allows a user to readily access one or more items located on the ramp via the opening.

Another embodiment of the invention is a method of manufacturing a bottle. The method comprises a step of injecting a resin into a mold to form a parison. An additional step includes blowing the parison to form the bottle, with the bottle comprising a body, a finish positioned above the body, and a ramp protruding into an interior space defined by the body. The body presents the interior space for housing items. The finish is positioned above the body and presents an opening for dispensing the items. The ramp is formed with a concave shape configured to support one or more items. The method further comprises the step of removing the bottle from the mold.

Yet another embodiment of the present invention includes a bottle configured to house and dispense items. The bottle comprises a body including a base and a sidewall extending up from the base and having a first radius of curvature. The body defines an interior space for housing the items. The bottle additionally comprises a finish positioned above the body and presenting an opening for dispensing the items from the body. The bottle further comprises a ramp protruding into the interior space defined by the body, with the ramp being formed with a concave shape having a second radius of curvature that is shorter than the first radius of curvature and is configured to support one or more of the items.

Still another embodiment of the present invention includes a method of manufacturing a bottle. The method comprising a step of extruding a resin to form a bottle, with the bottle being formed in a mold. The bottle comprises a body presenting an interior space for housing items. The bottle additionally comprise a finish positioned above the body and presenting an opening for dispensing the items. The bottle further comprises a ramp protruding into the interior space defined by the body, with the ramp being formed with a concave shape configured to support one or more items. The method includes a further step of removing the bottle from the mold.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
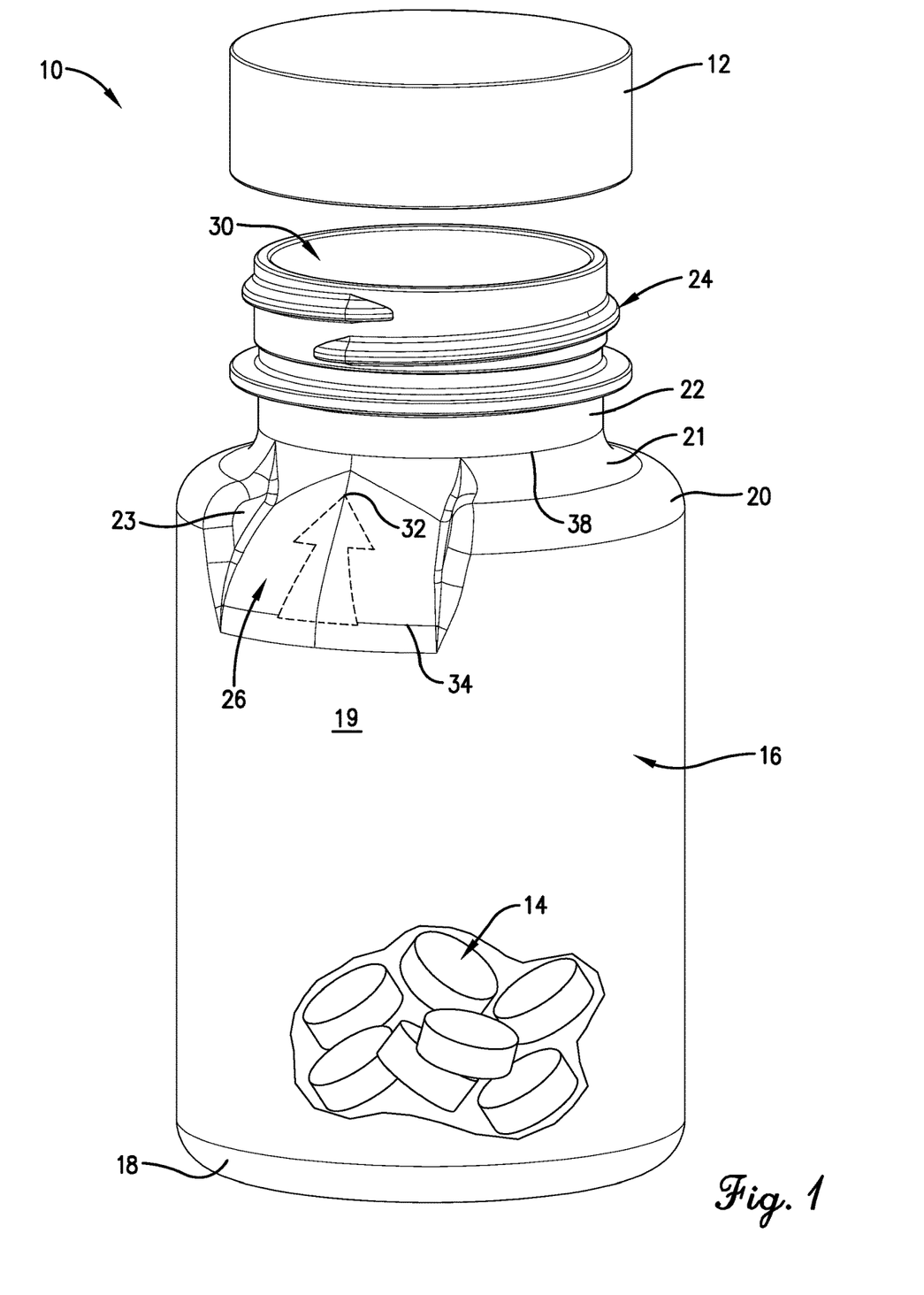
FIG. 1 is a perspective view of a bottle constructed in accordance with embodiments of the present invention housing one or more items and covered by a bottle cap.
Figure 2:
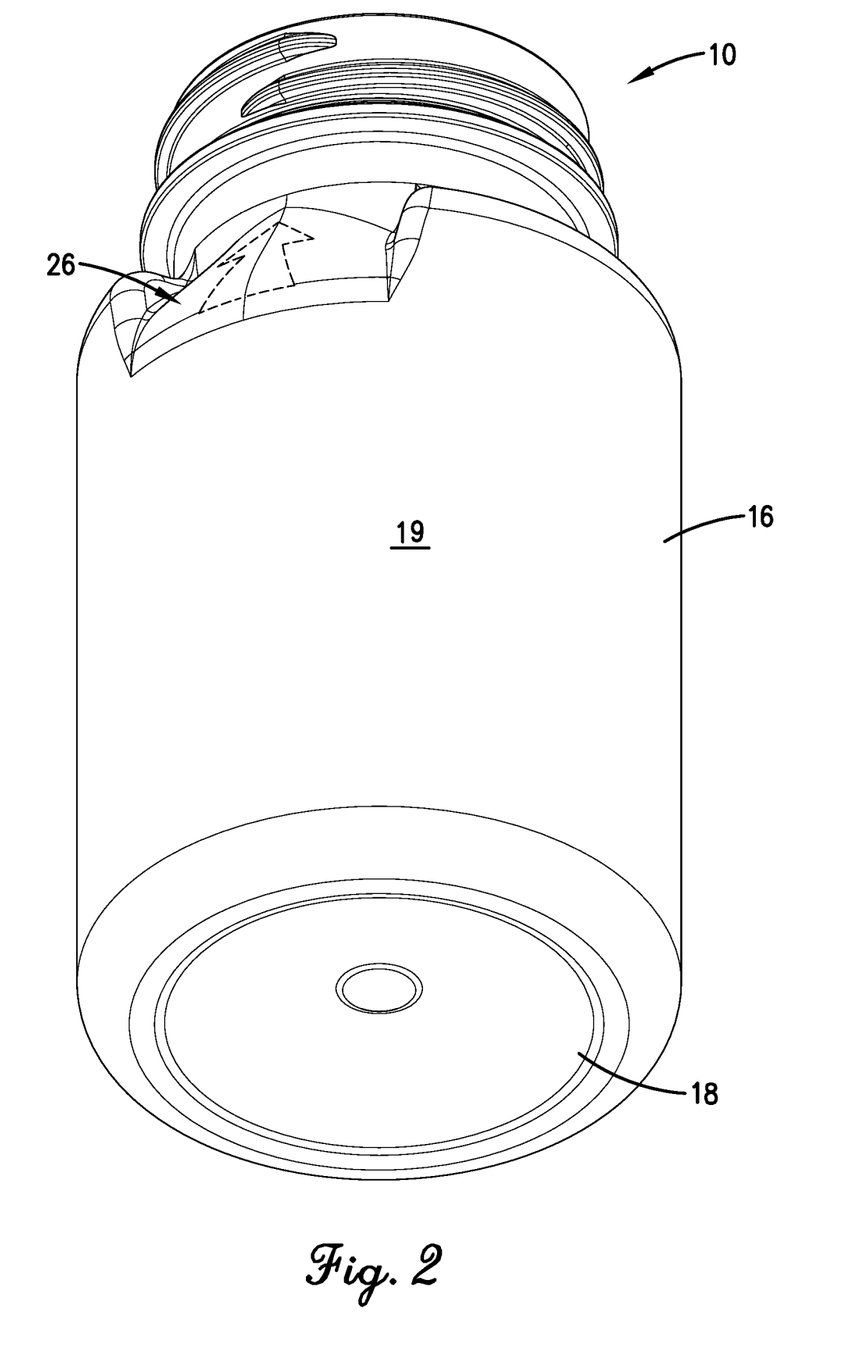
FIG. 2 is a lowered perspective view of the bottle of FIG. 1.

Turning to FIG. 1, a bottle 10 constructed in accordance with an embodiment of the present invention is illustrated. The bottle 10 may be configured to engage a cap 12 and to house one or more items 14. The one or more items 14 may comprise pills, tablets, vitamins, gummies, or the like. In some embodiments, one or more of the items 14 may include cotton balls or desiccants.

The bottle 10 broadly comprises a body 16 (which includes a base 18 and a sidewall 19 extending up from the base 18), an upper shoulder 20, a transition 21, a neck 22, a finish 24, and a ramp 26. The sidewall 19 of the body 16 may be formed in a generally cylindrical sidewall 19 shape and extend up from the base 18 towards an opening 30 (with the opening 30 defined by the upper shoulder 20, the transition 21, and/or the finish 24). However, embodiments of the present invention provide for the body 16 to have generally any shape without departing from the scope of the present invention. Regardless, the body 16 of the bottle 10, including the base 18 and the sidewall 19, presents an interior space for housing the one or more items 14. The shoulder 20 may extend generally horizontally from the sidewall 19. The neck 22 and the finish 24 may be any shape and/or size without departing from the scope of the present invention. In some embodiments, the diameter of the sidewall 19 may be longer than the diameter of the opening 30.

The ramp 26 may comprise an upper portion 32 and a lower portion 34, and may project inwardly from the cylindrical sidewall 19 into the interior space presented by the body 16 of the bottle 10. Specifically, the ramp 26 may extend from the sidewall 19 to the neck 22 or to the finish 24 through the shoulder 20 and/or the transition 21. In certain embodiments, the ramp 26 may be integrally formed with the body 16, such as integrally formed with the sidewall 19 and include ramp sidewalls 23 (See, e.g., FIG. 1) connecting inwardly projecting main portion 36 of the ramp 26 with the sidewall 19 of the bottle 10. In some other embodiments, the ramp 26 may be a separate component from the body 16 but, nonetheless, engaged with or secured to the body 16. Regardless, the ramp 26 will generally be configured to extend into the interior space presented by the body 16. Thus, the ramp 26 may reduce the overall internal volume of the bottle 10, within which items 14 may be stored. In some embodiments, any volume of the interior space that is reduced due to the ramp 26 may be made up via the ramp 26 having transitioning radius of curvature that changes value from the lower portion 34 to the upper portion 32 in a manner that provides for additional volume-adjacent to the upper shoulder 20, the transition 21, and/or the finish 24, so that no overall volume of the bottle 10 is lost. In some embodiments, the transitioning radius of curvature can be specifically configured (e.g., perhaps made shorter) in order to increase the overall volume of interior space of the bottle 10.

As noted above, the ramp 26 may be integrally formed with the sidewall 19 of the bottle 10. In some embodiments, the ramp 26 may be formed from the material of the sidewall 19 of the bottle 10 (i.e., a cross-sectional thickness of the material of the ramp 26 is generally equal to the cross-sectional thickness of the material of the sidewall 19), such that (i) from the exterior perspective (e.g., as illustrated in FIGS. 1-5), the ramp 26 is indented inwardly from main portions of the sidewall 19, and (ii) from the interior perspective (e.g., as illustrated in FIGS. 8-12), the ramp 26 protrudes outwardly from the main portions of the sidewall 19 into the interior space of the bottle 10. In other embodiments, the ramp 26 may be formed with a cross-sectional thickness that is greater than the cross-sectional thickness of the material of the sidewall 19, such that that the ramp 26 protrudes outwardly from the main portions of the sidewall 19 (from an interior perspective), but the exterior surface of the bottle 10 may not be indented (i.e., the exterior of the bottle has a generally smooth, uniform cylindrical shape). Regardless, the ramp 26 of the bottle 10, protruding into the interior space of the bottle 10, will generally be configured to facilitate efficient dispensing of the items 14 from the interior space of the bottle 10. In some embodiments, the bottle 10 may also include childproofing or other security features (e.g., integrated with the finish 24 and/or cap 12). In such embodiments, the ramp 26 may be positioned below the security features.

To facilitate the efficient dispensing of the items 14 from the bottle 10, the ramp 26 may be formed with a concave shape when viewing from an interior perspective of the bottle (e.g., as illustrated in FIGS. 8-12). The ramp 26 may have a longitudinal concave surface (e.g., vertically oriented along a height of the bottle 10) to help center one or more of the items 14 on the ramp 26, thereby making it easier to pull the item 14 up the ramp 26. If the ramp 26 had a flat surface or convex shape, the items 14 would be difficult to get up the ramp 26 toward the opening 30 of the bottle 10 without sliding off to the side of the ramp 26. The ramp 26 may also be formed to be laterally concave (side-to-side or laterally orientated along a width or circumference of the bottle 10) to help one or more of the items 14 to be centered on the ramp 26.

To illustrate such functionality, the bottle 10 may initially be positioned in an upright configuration, as shown in FIG.

1. In such a configuration, the items 14 within the bottle 10 are housed within the body 16 and supported on the base 18 of the bottle 10 (perhaps stacked on each other). To dispense an item 14, the bottle 10 can be tipped from the upright position to its side or such that it is oriented downward (with the opening 30 directed downward), such that the ramp 26 is oriented generally horizontally or downwardly so that one or more items 14 are guided from the bottom of the bottle 10 onto the ramp 26. In some embodiments, the ramp 26 may have a size that permits only a single item 14 to be received on the ramp 26. Beneficially, the concave shape of the ramp 26 allows the items 14 received on the ramp 26 to remain positioned on the ramp 26 without falling off the ramp 26 (laterally or longitudinally). Thus, the concave shape of the ramp 26 may be in the form of a lateral concavity and/or a longitudinal concavity.

Figure 4:
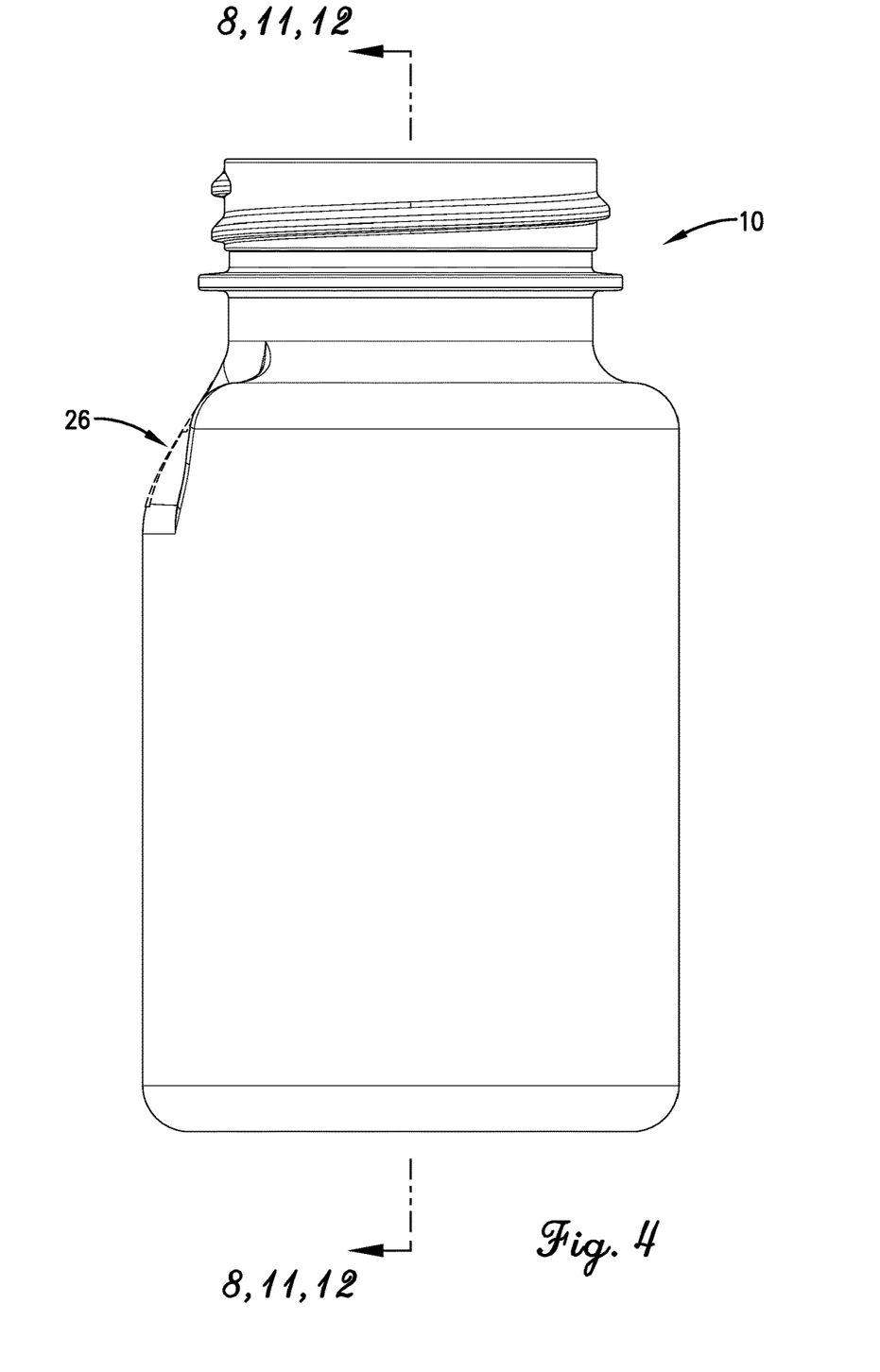
FIG. 4 is a is a side elevation view of the bottle of FIG. 1.
Figure 5:
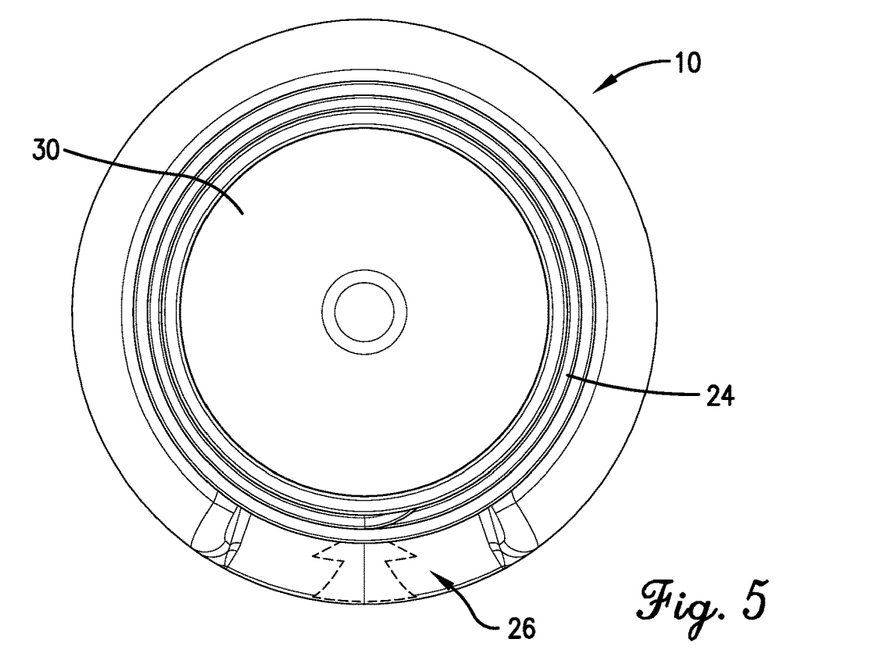
FIG. 5 is a is a top plan view of the bottle of FIG. 1.
Figure 6:
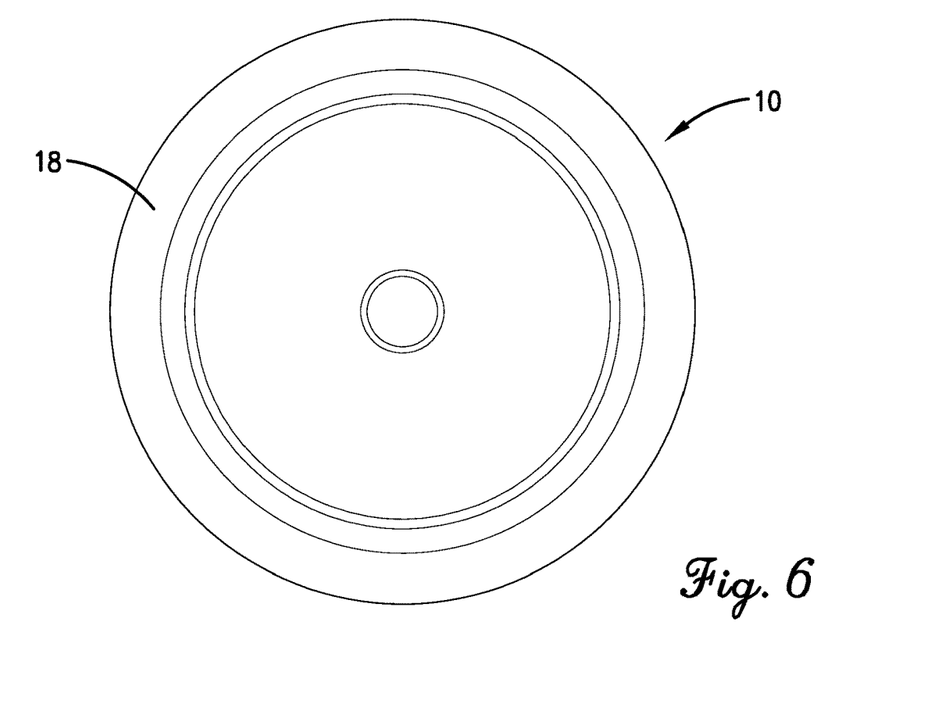
FIG. 6 is a is a bottom plan view of the bottle of FIG. 1.
Figure 7:
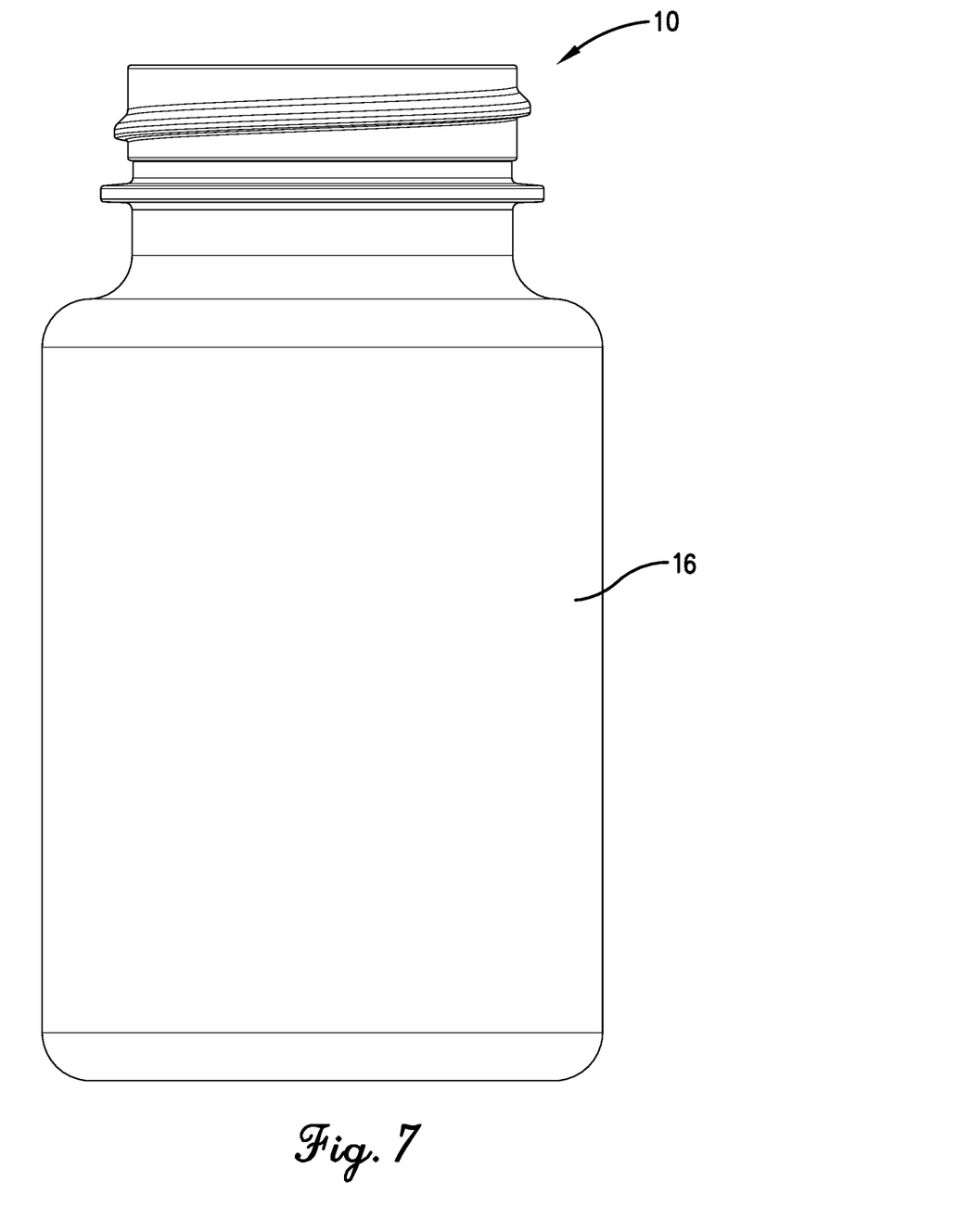
FIG. 7 is a is a rear elevation view of the bottle of FIG. 1.

Once one or more items 14 have been received on the ramp 26, the bottle 10 may be further tipped (with the opening 30 directed downward) so as to cause the one or more items 14 to slide along the ramp 26 towards the opening 30 of the bottle 10 to be dispensed from the opening 30. Alternatively, or in addition, a user can extend one or more of their fingers (or other elongated tools or elements) down into the opening 30 of the bottle 10, and guide (using their fingers(s)) the one or more items 14 along the ramp 26 and out of the opening 30 of the bottle 10. The ramp 26 allows the items 14 to be removed from the bottle 10 one at a time using a finger. Because the ramp 26 is proximate to the opening 30 of the bottle 10, a user's finger does not have to bend significantly to remove one or more of the items 14. This is especially beneficial to users having arthritis or nerve damage. The ramp 26 also avoids accidental spills caused by shaking a bottle to get items over the shoulder 20 of the bottle 10 and into the opening 30. Such spills can be expensive because the items 14 may comprise expensive medication. The ramp 26 also makes it easier to remove items 14 such as cotton balls and/or desiccants from inside the bottle 10. In some embodiments, the ramp 26 may form an indention on the exterior of the bottle 10, as depicted in FIG. 4. The indentation formed by the ramp 26 can be used to provide a secure grip for holding the bottle 10.

Figure 3:
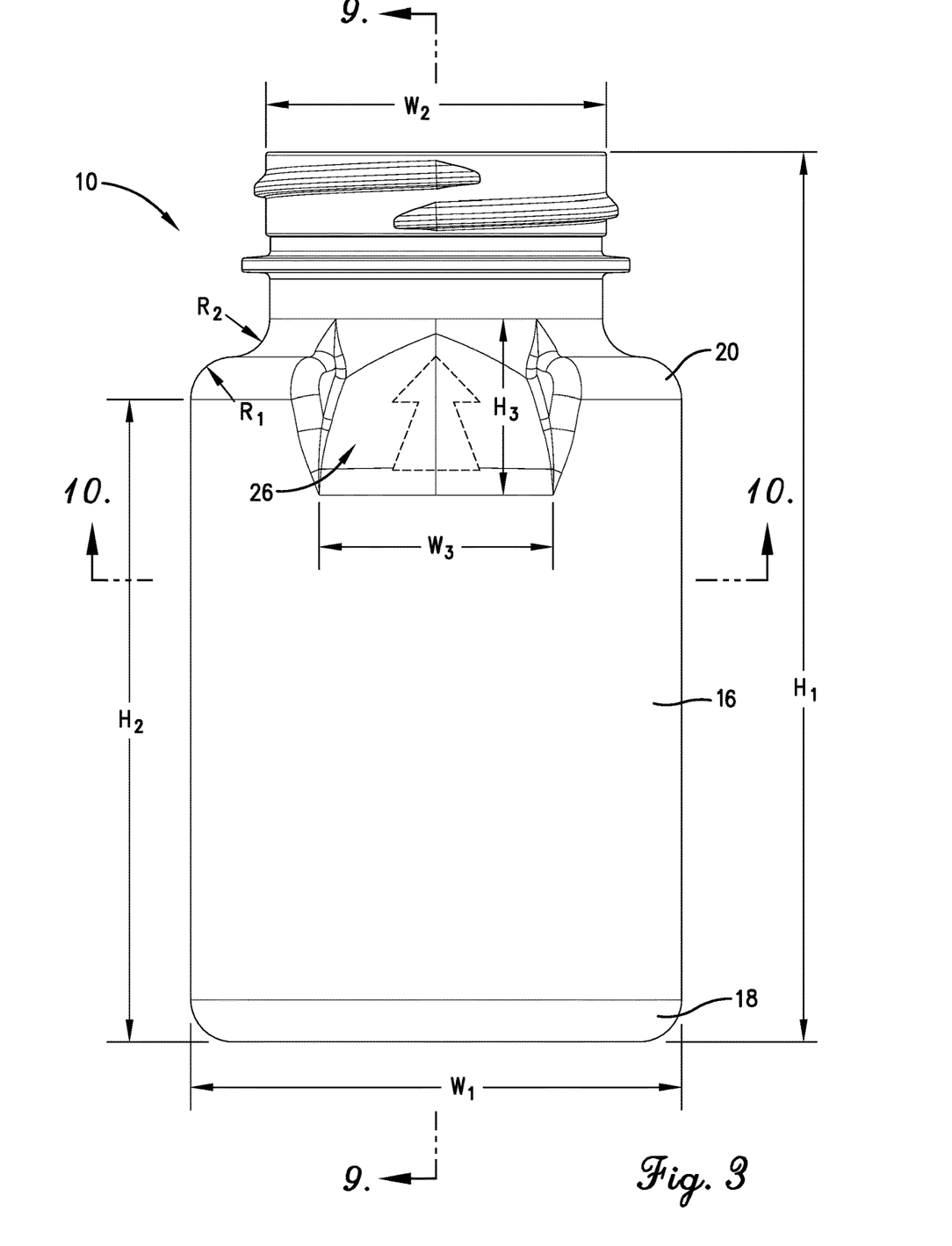
FIG. 3 is a front elevation view of the bottle of FIG. 1.

In some embodiments, the bottle 10 may have an overall height H1, as illustrated in FIG. 3, of between 5.08-25.4 cm (2-10 inches), between 6.35-20.32 cm (2.5-8 inches), between 7.62-15.24 cm (3-6 inches), or about 8.89 cm (3.5 inches). The body 16, including the base 18 and the sidewall 19 of the bottle 10, may have a height H2 between 2.54-20.32 cm (1-8 inches), between 3.81-15.24 cm (1.5-6 inches), between 5.08-12.7 cm (2-5 inches), or about 7.112 cm (2.8 inches). In some embodiments, the outer surface of the sidewall 19 starting below the ramp 26 and extending above the base 18 may function as a label panel area and include upper and lower gaps where tolerance is needed for a label. In some embodiments, the presence of the ramp 26 makes the label panel area smaller, which reduces manufacturing costs by lowering the amount of material to make the label. In some embodiments, a label can be customized, or have a portion cut out, so that it extends along the side of the ramp 26.

The bottle 10 may have an overall width W1, as illustrated in FIG. 3, of between 1.27-13.97 cm (0.5-5 inches), between 2.54-10.16 cm (1-4 inches), between 3.81-7.62 cm (1.5-3 inches), or about 5.08 cm (2 inches). The opening 30, presented at the top of the bottle 10 (at the finish 24), may have a width W2 between 1.016-10.16 cm (0.4-4 inches), between 1.905-7.62 cm (0.75-3 inches), between 2.54-6.35 cm (1-2.5 inches), or about 3.556 cm (1.4 inches). The shoulder 20 may transition from the cylindrical sidewall 19 with a radius of curvature R1, as illustrated in FIG. 3, of between 0.254-2.54 cm (0.1-1 inches), between 0.381-1.27 cm (0.15-0.5 inches), between 0.381-0.762 cm (0.15-0.3 inches), or about 0.508 cm (0.2 inches). The transition 21 may transition from the upper shoulder 20 to the neck 22 with a radius of curvature R2 of between of between 0.254-2.54 cm (0.1-1 inches), between 0.254-1.016 cm (0.1-0.4 inches), between 0.381-0.762 cm (0.15-0.3 inches), between 0.381-1.27 cm (0.15-0.5 inches), or about 0.508 cm (0.2 inches).

Figure 10:
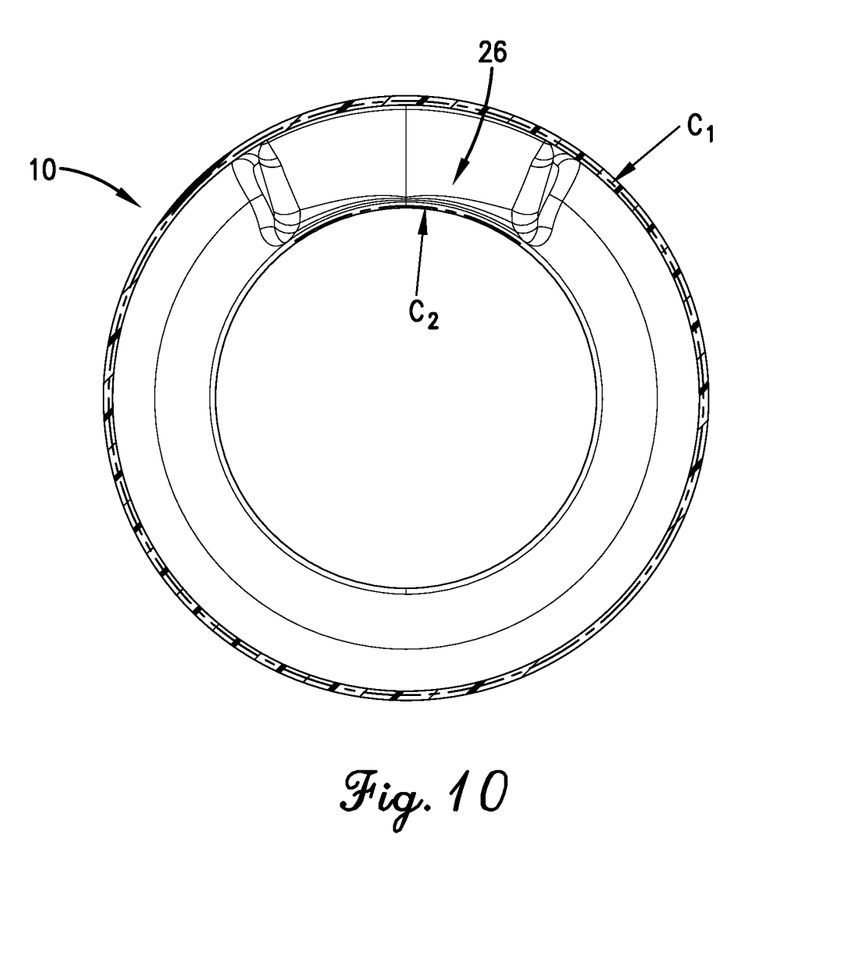
FIG. 10 is a cross-sectional view of the bottle of FIG. 1 taken along line 10-10 of FIG. 3.

The ramp 26 may have an overall height H3, as illustrated in FIG. 3, of between 0.508-5.08 cm (0.2-2 inches), between 1.016-3.81 cm (0.4-1.5 inches), between 1.27-2.54 cm (0.5-1 inches), or about 1.778 cm (0.7 inches). In some embodiments, a ratio of the height H2 of the body 16 of the bottle 10 to the height H3 of the ramp 26 may be about or no more than 15:1, about or no more than 12:1, about or no more than 10:1, about or no more than 8:1, about or no more than 6:1, about or no more than 5:1, about or no more than 4:1, about or no more than 3:1, about or no more than 2.5:1, about or no more than 2:1, or between 2:1 and 15:1, between 2:1 and 10:1, between 3:1 and 8:1, between 3:1 and 6:1, between 2:1 and 4:1, or between 2.5:1 to 3.5:1. The ramp 26 may have an overall width W3 between 1.27-3.81 cm (0.5-1.5 inches), between 1.905-3.175 cm (0.75-1.25 inches), between 2.032-2.54 cm (0.8-1 inches), or about 2.286 cm (0.9 inches). In some embodiments, a ratio of the width W1 of the bottle 10 to the width W3 of the ramp 26 may be about 1.5:1, about 2:1, about 3:1 or between 1.5:1 and 3:1, or between 1.5:1 and 2.5:1, or between 2:1 to 3:1. In some embodiments, the width W3 of the ramp 26 may have a minimum value relative to a size of one or more of the items 14, otherwise the items 14 may be difficult to support by or may become hard to get up the ramp 26. In some embodiments, a circumferential length C1 of the body 16, as illustrated in FIG. 10, may have a ratio with respect to a circumferential length C2 of the ramp 26 of about 3:1, about 4:1, about 5:1, or about 6:1, or between 3:1 and 6:1, or between 4:1 and 6:1, or between 4.5:1 to 5.5:1.

Figure 8:
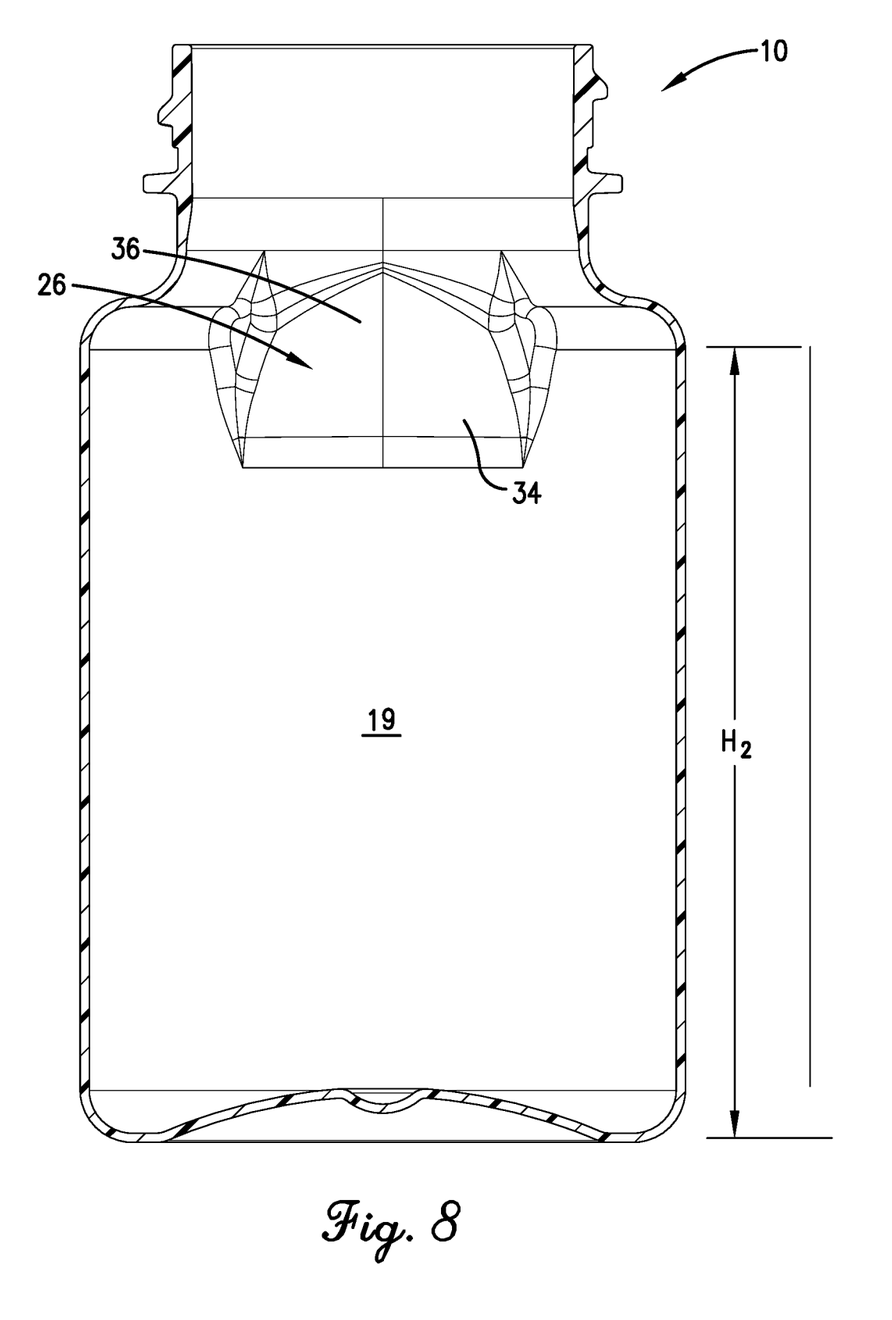
FIG. 8 is a cross-sectional view of the bottle of FIG. 1 taken along line 8-8 of FIG. 4.
Figure 11:
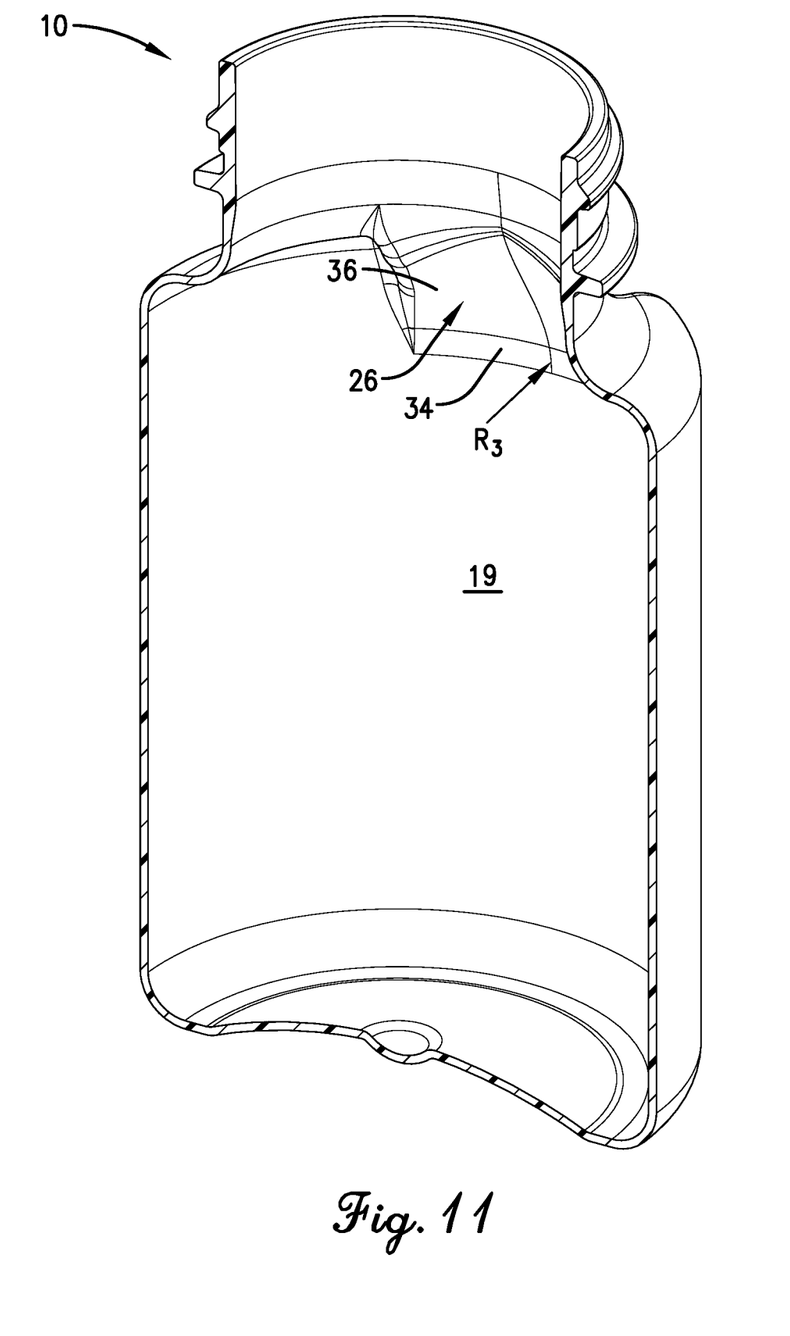
FIG. 11 is a perspective view of a cross-section of the bottle of FIG. 1 taken along line 11-11 of FIG. 4.
Figure 12:
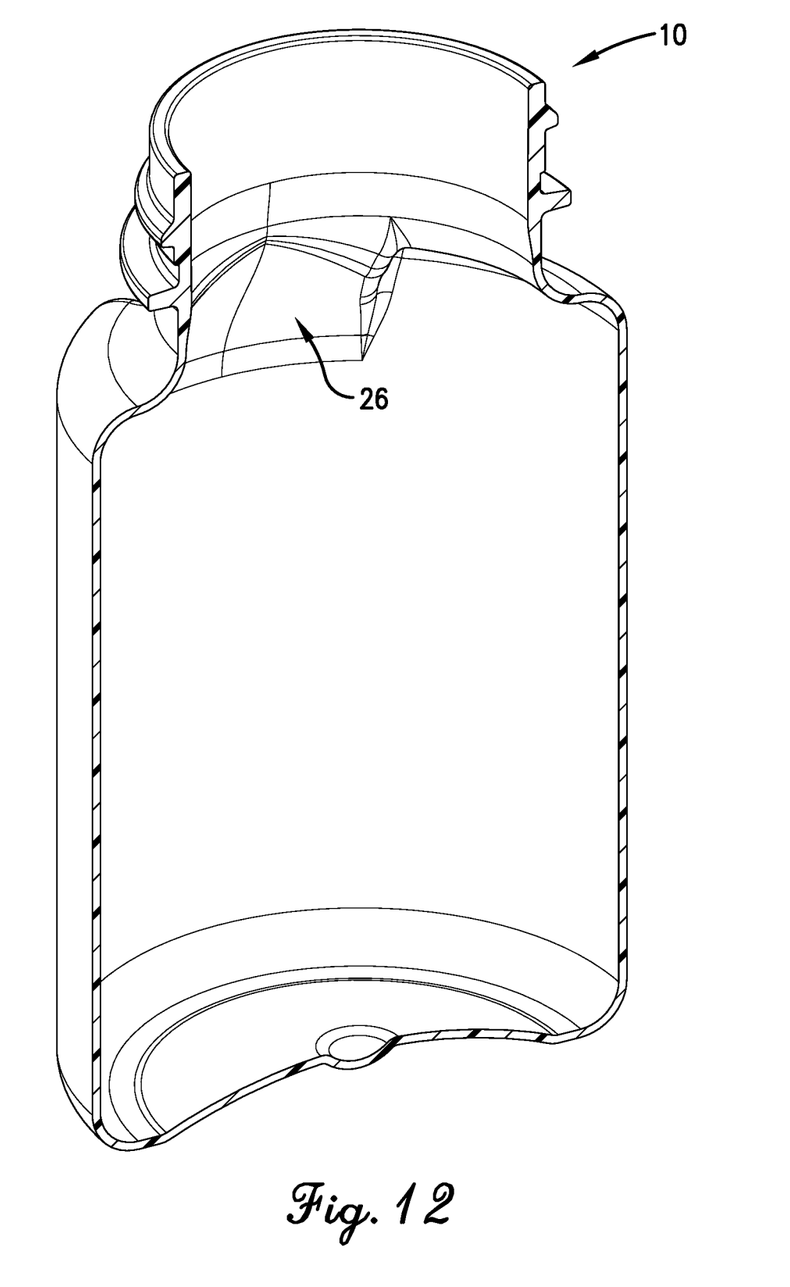
FIG. 12 is a perspective view of a cross-section of the bottle of FIG. 1 taken along line 12-12 of FIG. 4.

As illustrated in FIGS. 8 and 11, the ramp 26 may include a bottom that may begin to extend away from the sidewall 19 of the bottle 10 and into the interior space of the bottle 10 (from an interior perspective) above or near the one-half, the two-third, or the three-quarter mark of the height H2 of the body 16. It should be understood, however, that the bottom of the ramps 26 of larger bottles 10 may extend lower than bottoms of the ramps 26 of smaller bottles 10 (such that the radii of curvature of the ramps 26 of smaller or larger bottles 10 are generally the same). The ramp 26 may then extend outward and upward to the upper shoulder 20 of the bottle 10 so as to transition to the upper shoulder 20. Specifically, where the upper portion 32 of the ramp 26 transitions to the upper shoulder 20, the concave shape of the ramp 26 may transition to form an obtuse corner. Embodiments provide for the top of the ramp 26 (as well as the upper shoulder 20) to be positioned at least nominally below the support bead of the finish 24, or about 2.54-0,127 cm (1-0.05 inches), about 1.905-0.8382 cm (0.75-0.33 inches), or about 1.27 cm (0.5 inches) below the support bead.

To facilitate such a configuration, the bottom of the ramp 26 may extend away from the sidewall 19 of the bottle 10 at a radius of curvature R3, as illustrated in FIG. 11, between 0.508-2.54 cm (0.2-1 inches), between 0.762-1.905 cm (0.3-0.75 inches), between 1.016-1.524 cm (0.4-0.6 inches), or about 1.27 cm (0.5 inches). In preferred embodiments, the radius R3 is greater than zero because if there is a sharp corner or no radius at the bottom of the ramp 26, the items 14 can snag where the ramp 26 and the sidewall 19 meet.

Figure 9:
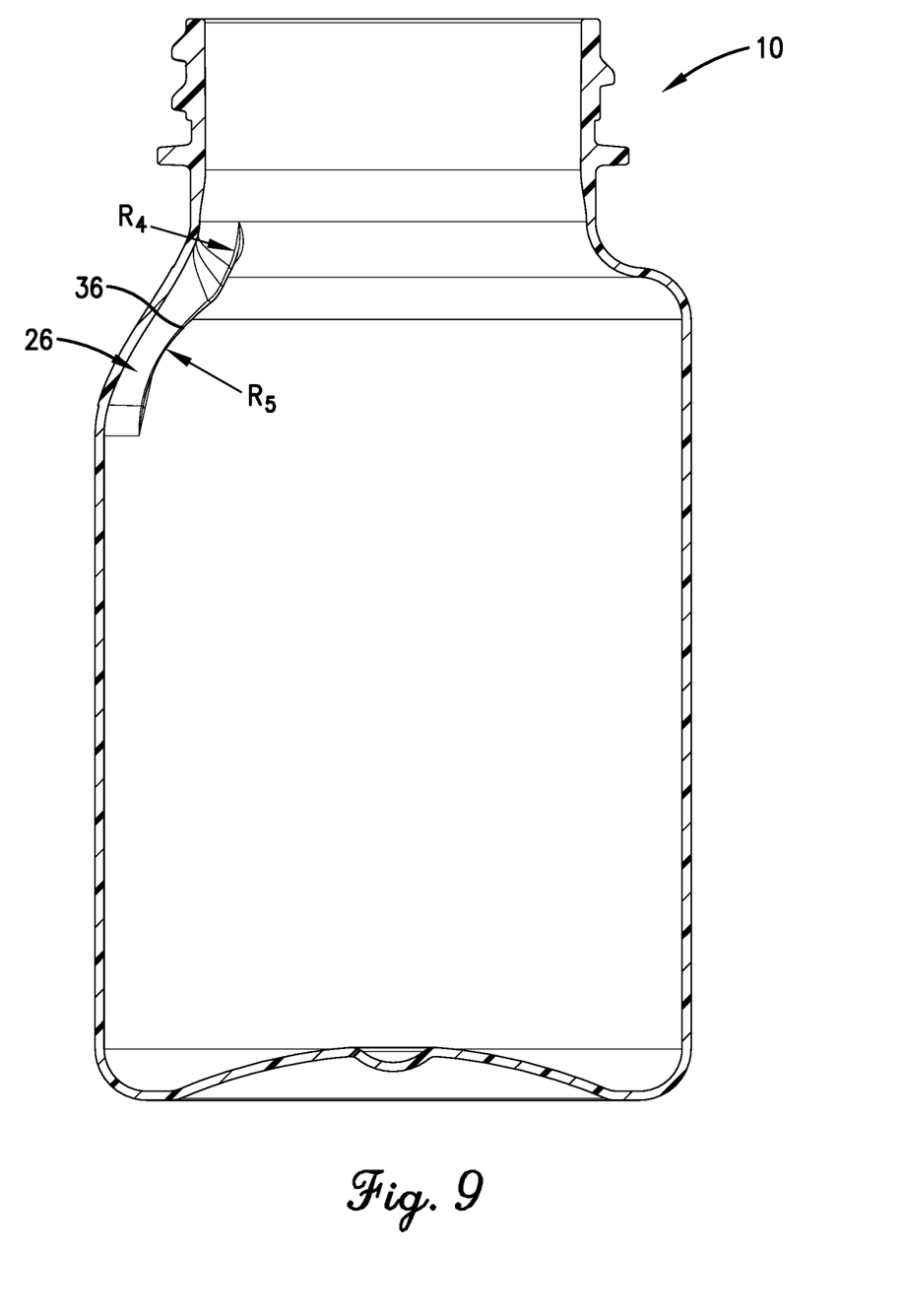
FIG. 9 is a cross-sectional view of the bottle of FIG. 1 taken along line 9-9 of FIG. 3.

The top of the ramp 26 may integrate with the neck 22 (at or near the same position that the upper shoulder 20 integrates with the neck 22) at a radius of curvature R4, as illustrated in FIG. 9, between 0.508-2.54 cm (0.2-1 inches), between 0.762-1.905 cm (0.3-0.75 inches), between 1.016-1.524 cm (0.4-0.6 inches), or about 1.27 cm (0.5 inches). In preferred embodiments, the radius R4 is greater than zero because if there is a sharp corner or no radius at the top of the ramp 26, the items 14 can snag where the ramp 26 and the neck 22 meet. In some embodiments, the top of the ramp 26 may start at the same height of a support bead 38 to approximately 1.27 cm (0.5 inches) below the support bead 38.

The overall radius of curvature of a main portion 36 of the ramp 26 may have a radius of curvature R5, as illustrated in FIG. 9, of between 17.78-38.1 cm (7-15 inches), between 20.32-30.48 cm (8-12 inches), between 22.86-27.94 (9-11 inches), or about 26.67 cm (10.5 inches). In some embodiments, the sidewall 19 will have a radius of curvature that is greater than the radius of curvature R5 of the ramp 26. For example, the sidewall 19 may have a first radius of curvature and the lateral concavity of the ramp 26 has a second radius of curvature that is shorter than the first radius of curvature. Alternatively, or in addition, the sidewall 19 may have a first radius of curvature and the longitudinal concavity of the ramp 26 has a second radius of curvature that is shorter than the first radius of curvature. As such, the ramp 26 may extend away from the main portions of the sidewall 19 (i.e., protrude into the interior space of the bottle 10) a distance of between 0.381-1.27 cm (0.15-0.5 inches), between 0.508-1.016 cm (0.2-0.4 inches), or about 0.762 cm (0.3 inches). The angle formed in the main portion 36 of the ramp 26, i.e., the portion having the radius of curvature R5, is preferably not too steep so that the item 14 can readily be pulled up the ramp 26 by finger.

The bottle 10 may be formed in an injection, stretch blow molding (two step SBM), injection stretch blow molding (one step ISBM), injection blow molding (IBM), extrusion blow molding (EBM), and/or extrusion compression blow molding machine/process. The bottles may be formed from High Density Polyethylene (HDPE), Polyethylene Terephthalate (PET, PETE), Polypropylene (PP), Polystyrene (PS) or other plastics. In some embodiments, the bottles may have a volume of between 75 cc to 950 cc.

An exemplary method of using a bottle to dispense items from the bottle may comprise providing a bottle that includes a body, a finish positioned above the body, and a ramp. The body may present an interior space for housing the items. The finish may present an opening for dispensing the items. The ramp may protrude into the interior space defined by the body and may be formed with a concave shape configured to support one or more items. The bottle may be a packer bottle, and the items may be pills or tablets.

The method may further include tilting the bottle such that one or more items are received on the ramp. The ramp may be configured to receive a single item at a time.

The method may further include extending an object within the opening of the bottle and guiding the one or more items along the ramp and out of the opening of the bottle. The object may be a finger, utensil, or the like.

Figure 13:
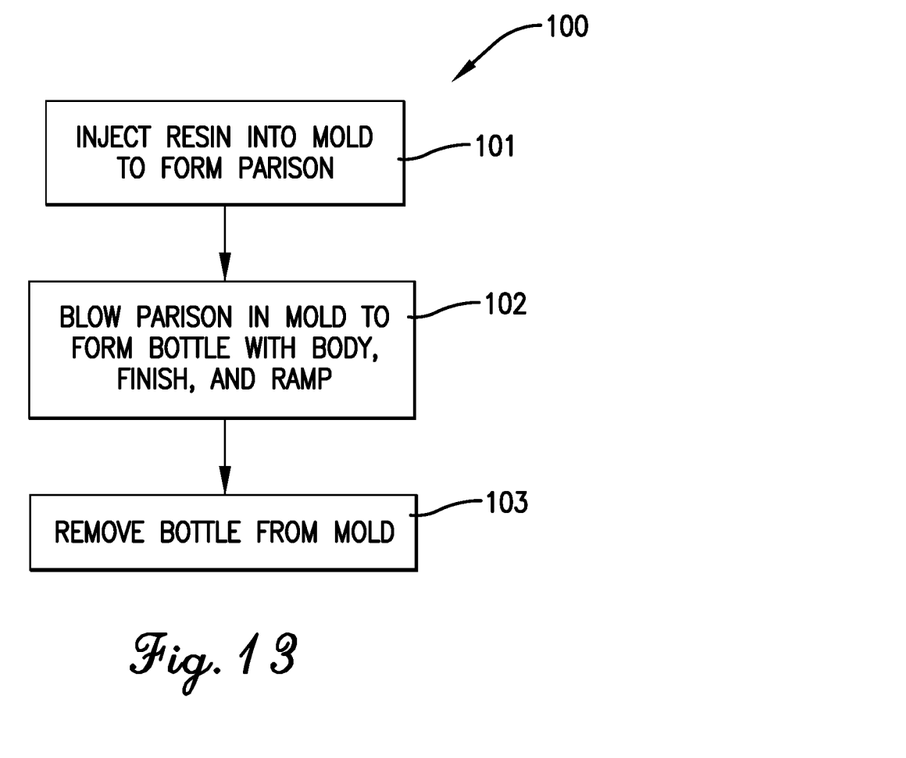
FIG. 13 is a flowchart illustrating a method of manufacturing a bottle according to an embodiment of the present invention.

The flow chart of FIG. 13 depicts the steps of an exemplary method 100 of manufacturing a bottle. In some alternative implementations, the functions noted in the various blocks may occur out of the order depicted in FIG. 13. For example, two blocks shown in succession in FIG. 13 may in fact be executed substantially concurrently, or the blocks may sometimes be executed in the reverse order depending upon the functionality involved. In addition, some steps may be optional.

Referring to step 101, a resin is injected into a mold to form a parison. The resin may comprise High Density Polyethylene (HDPE), Polyethylene Terephthalate (PET, PETE), Polypropylene (PP), Polystyrene (PS) and/or other plastics.

Referring to step 102, the parison is blown to form a bottle having a body, a finish, and a ramp. The body may present an interior space for housing items therein. The finish may be positioned above the body and present an opening for dispensing the items. The ramp may protrude into the interior space defined by the body and be formed with a concave shape configured to support one or more items. The mold may be configured to impart these features to form the bottle. In some embodiments, the bottle may be a packer bottle. In some embodiments, the blowing of the parison in this step 102 may comprise injection blow molding. In some embodiments, the blowing of the parison in this step 102 may comprise injection stretch blow molding. The injection stretch blow molding may be a one-step injection stretch blow molding process, a two-step injection stretch blow molding process, or a one-and-a-half-step injection stretch blow molding process.

Referring to step 103, the bottle may be removed from the mold.

The method 100 may include additional, less, or alternate steps and/or device(s), including those discussed elsewhere herein.

Figure 14:
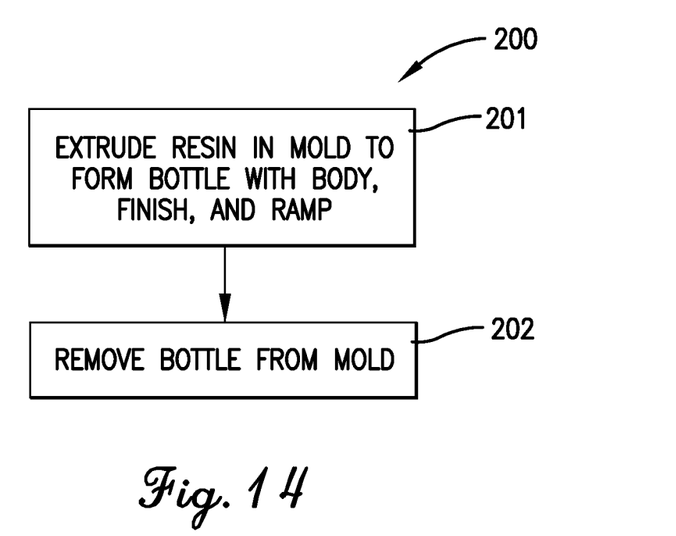
FIG. 14 is a flowchart illustrating another method of manufacturing a bottle according to an embodiment of the present invention.

The flow chart of FIG. 14 depicts the steps of another exemplary method 200 of manufacturing a bottle. In some alternative implementations, the functions noted in the various blocks may occur out of the order depicted in FIG. 14. For example, two blocks shown in succession in FIG. 14 may in fact be executed substantially concurrently, or the blocks may sometimes be executed in the reverse order depending upon the functionality involved. In addition, some steps may be optional.

Referring to step 201, a resin is extruded into a mold to form a bottle comprising a body, a finish, and a ramp. The resin may comprise High Density Polyethylene (HDPE), Polyethylene Terephthalate (PET, PETE), Polypropylene (PP), Polystyrene (PS) and/or other plastics. The body may present an interior space for housing items therein. The finish may be positioned above the body and present an opening for dispensing the items. The ramp may protrude into the interior space defined by the body and be formed with a concave shape configured to support one or more items. The mold may impart these features on the bottle. This step 201 may comprise extrusion blow molding, such that the resin is extruded to form a parison and then blown in the mold to form the bottle.

Referring to step 202, the bottle is removed from the mold.

The method 200 may include additional, less, or alternate steps and/or device(s), including those discussed elsewhere herein.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims of any subsequent regular utility application.

The invention claimed is:

1. A bottle configured to house and dispense items, said bottle comprising:
    a body comprising a base and a sidewall extending up from said base, wherein said body defines an interior space for housing the items;
    a finish positioned above said body and presenting an opening for dispensing the items from said body; and
    a ramp protruding into the interior space defined by said body, wherein said ramp is formed with a concave shape configured to support one or more of the items.

2. The bottle of claim 1, wherein said ramp includes a lateral concavity along a width of said bottle.

3. The bottle of claim 2, wherein said sidewall has a first radius of curvature and the lateral concavity of said ramp has a second radius of curvature that is shorter than the first radius of curvature.

4. The bottle of claim 1, wherein said body has a first height and the ramp has a second height, the ratio of the first height to the second height is between 2:1 to 10:1.

5. The bottle of claim 1, further comprising a shoulder extending generally horizontally from said sidewall of said body, and a neck connecting said shoulder to said finish.

6. The bottle of claim 5, wherein the interior space defined by said body has a first diameter and the opening presented by said finish has a second diameter shorter than the first diameter.

7. The bottle of claim 6, wherein said ramp includes a side wall extending radially outward from a main portion of said ramp toward said sidewall of said body.

8. The bottle of claim 5, wherein said ramp extends from said sidewall to said neck.

9. The bottle of claim 1, wherein said ramp includes a longitudinal concavity along a height of said bottle.

10. The bottle of claim 1, wherein said ramp is integrated with said sidewall, and wherein said ramp is indented inwardly from an exterior of said sidewall of said body, so as to form a gripping element for a user of said bottle.

11. A method of manufacturing a bottle, said method comprising:
    (a) injecting a resin into a mold to form a parison;
    (b) blowing the parison to form the bottle, wherein the bottle comprises—
        a body presenting an interior space for housing items,
        a finish positioned above the body and presenting an opening for dispensing the items, and
        a ramp protruding into the interior space defined by the body, wherein the ramp is formed with a concave shape configured to support one or more items; and
    (c) removing the bottle from the mold.

12. The method of claim 11, wherein said blowing of step (b) comprises injection blow molding.

13. The method of claim 11, wherein said blowing of step (b) comprises injection stretch blow molding.

14. The method of claim 13, wherein said injection stretch blow molding is a one-step injection stretch blow molding process.

15. A bottle configured to house and dispense items, said bottle comprising:
    a body comprising a base and a sidewall extending up from said base and having a first radius of curvature, wherein said body defines an interior space for housing the items;

a finish positioned above said body and presenting an opening for dispensing the items from said body; and a ramp protruding into the interior space defined by said body, wherein said ramp is formed with a concave shape having a second radius of curvature that is shorter than the first radius of curvature and is configured to support one or more of the items.

16. The bottle of claim 15, wherein the interior space defined by said body has a first diameter and the opening presented by said finish has a second diameter shorter than the first diameter, further comprising a shoulder extending generally horizontally from said sidewall of said body and connecting to said finish, wherein said ramp extends from said sidewall to said finish through said shoulder.

17. The bottle of claim 15, wherein said ramp includes a lateral concavity along a width of said bottle.

18. The bottle of claim 15, wherein said ramp includes a longitudinal concavity along a height of said bottle.

19. The bottle of claim 15, wherein said ramp is integrated with said sidewall, and wherein said ramp is indented inwardly from an exterior of said sidewall of said body, so as to form a gripping element for a user of said bottle.

20. The bottle of claim 15, wherein said body has a first height and the ramp has a second height, the ratio of the first height to the second height is between 2:1 to 10:1.

21. A method of manufacturing a bottle, said method comprising:
 (a) extruding a resin to form a bottle, wherein the bottle is formed in a mold and comprises—
  a body presenting an interior space for housing items,
  a finish positioned above the body and presenting an opening for dispensing the items, and
  a ramp protruding into the interior space defined by the body, wherein the ramp is formed with a concave shape configured to support one or more items; and
 (c) removing the bottle from the mold.

22. The method of claim 21, wherein said extruding of step (a) comprises extrusion blow molding.

* * * * *